(12) United States Patent
Thore (10) Patent No.: US 6,711,529 B1
(45) Date of Patent: Mar. 23, 2004

(54) METHOD FOR DETERMINING AT LEAST ONE OPTIMAL TRAJECTORY FOR REACHING A FUZZY TARGET SITUATED IN A MEDIUM STARTING FROM A POINT REMOTE FROM THE TARGET

(75) Inventor: Pierre Thore, Pau (FR)

(73) Assignee: Elf Exploration Production (FR)

( * ) Notice: Subject to any disclaimer, the term of this patent is extended or adjusted under 35 U.S.C. 154(b) by 0 days.

(21) Appl. No.: 09/504,975

(22) Filed: Feb. 15, 2000

(30) Foreign Application Priority Data

Feb. 19, 1999 (FR) .............................. 99 02088

(51) Int. Cl.$^7$ .......................... G06F 17/10; G06F 7/60; G06F 101/00
(52) U.S. Cl. .................................. 703/2; 703/10; 702/6
(58) Field of Search ............................... 703/1–2, 9–10; 702/6–13

(56) References Cited

U.S. PATENT DOCUMENTS

| | | | |
|---|---|---|---|
| 5,812,493 A | 9/1998 | Robein et al. | 367/25 |
| 6,253,848 B1 * | 7/2001 | Reimers et al. | 166/254.1 |
| 6,272,434 B1 * | 8/2001 | Wisler et al. | 702/9 |

FOREIGN PATENT DOCUMENTS

| | | |
|---|---|---|
| FR | 2 688 909 | 9/1993 |
| FR | 2 737 909 | 2/1997 |

OTHER PUBLICATIONS

M.J. Roberts, et al., "Real–Time Geosteering in the Tern Field for Optimum Multilateral Well Placement", Proceedings of the 1998 European Petroleum Conference, Europec, Part 2, The Hague, Netherlands, Oct. 20–22, 1998, vol. 2, pp. 281–288.

S. T. Solomon, et al., "A Multidisciplined Approach to Designing Targets for Horizontal Wells", JPT Journal of Petroleum Technology, Feb. 1994, vol. 46, No. 2, pp. 143–149.

M. Wael Helmy, et al., "Well Design Using Computer Model", Proceedings of the 1997 10$^{th}$ Middle East Oil Show & Conference, Part 1, Bahrain, Saudi Arabia, Mar. 15–18, 1997, vol. 1, pp. 299–307.

* cited by examiner

Primary Examiner—Samuel Broda, Esq.
(74) Attorney, Agent, or Firm—Ostrolenk, Faber, Gerb & Soffen, LLP (57) ABSTRACT

Method for determining at least one optimal trajectory between a point and a target situated in a medium and forming a centered volume, the position of each of whose points is known with geometrical uncertainties, characterized in that it consists in defining for the centered volume a gain which takes different values from the center to the peripheral boundary, and a zero value outside the centered volume; in determining a statistically significant number of instances of the positions of the centered volume as a function of the geometrical uncertainties which affect it, and in determining an aggregate gain at each point; in defining a volume of interest, site of the points with positive aggregate gains in the medium; in defining curvilinear trajectories between at least one entry point and at least one exit point of the said volume of interest; in integrating the aggregate gain along each of the said curvilinear trajectories in such a way as to obtain a profit associated with each trajectory, and in retaining all the trajectories whose profit is greater than a threshold.

17 Claims, 9 Drawing Sheets

FIG_1

FIG. 2

FIG_3

FIG_4

FIG.5

FIG_6

FIG_7

FIG. 8

FIG_9

METHOD FOR DETERMINING AT LEAST ONE OPTIMAL TRAJECTORY FOR REACHING A FUZZY TARGET SITUATED IN A MEDIUM STARTING FROM A POINT REMOTE FROM THE TARGET

The present invention relates to a method for determining at least one optimal trajectory for reaching a fuzzy target in a three-dimensional medium starting from a point remote from the target.

In oil exploration, it is standard practice to seek to reach by drilling a geological structure situated in the subsurface and which might contain hydrocarbons. Very often, the start point for the drilling is positioned so as to take various constraints into account, in particular on-shore environmental constraints or off-shore optimization constraints.

Along with the growth in off-shore drilling, on account of the very high costs of marine production structures, it has been necessary to develop sophisticated techniques of directional drilling such that a single drilling start point can give access to several geological structures lying greater or lesser distances away in the subsurface. As a consequence of this, it is necessary to optimize the positioning of the production platform so as to obtain best access to all the sought-after geological structures. Therefore, the boreholes emanating from marine platforms sprout like upturned blooms in the subsurface. Ideally, the trajectory of a borehole lies in a vertical plane of chosen azimuth. It consists of a succession of rectilinear segments and arcs of circles strung together. The deviation of the borehole may be such that the trajectory of the borehole switches from a vertical direction at the origin to a horizontal direction when penetrating the geological structure.

A first problem has been knowing where the drilling tool was located at each instant during the progress of the borehole. This difficulty has been overcome firstly off-line through the use of single-shot, and then multi-shot photographic techniques which have made it possible to ascertain the azimuth and the inclination of the trajectory at regular intervals. These two measurements, allied with the drilled length, deduced from the length of the drill pipes, have made it possible to calculate the actual trajectory and hence the coordinates x, y, z of each measurement point in a three-dimensional orthonormal reference frame with the drilling kick-off as origin.

A second problem was knowing how to direct the drilling, in real time, towards a target point of the subsurface in as accurate a manner as possible. This technique did not experience a real upsurge until the development of directional turbodrilling associating the use of a downhole motor and a bent coupling. Initially, the measurements were carried out off-line by the single-shot photographic technique with each addition of drill pipes. Thereafter, the development of a special tool fitted with magnetometers and accelerometers and incorporated into the drill string (MWD standing for "Measurement While Drilling") has made it possible to transmit azimuth and inclination of the trajectory in real time without interrupting drilling operations. More recently, the designing of flexible drill pipes has made it possible to reduce considerably the radii of curvature of trajectories, thus making it possible to switch from the vertical to the horizontal within a few tens of meters.

The duration of drilling is a critical parameter on account of the costs which it entails. This duration should therefore be reduced to a minimum. An effective way of reducing the duration of drilling is to reduce the trajectory of the drilling to an optimal length, for example a minimum. The problem of calculating the trajectory of the borehole from the start point to the location of the structure in the subsurface has thus been proposed. Posed in these terms, the problem has been solved for a number of years now. Thus, the Wellbore Planner® software, marketed by Landmark, makes it possible, among other things, to calculate various well trajectories deviated towards target structures chosen in the subsurface. Likewise, the article by M. Wael Helmi, F. Khalef, T. Darwish, entitled "Well design using computer model" and published by the Society of Petroleum Engineers SPE 37709 of 15-18/03/97, pages 299–307, proposes a method for calculating the trajectory of a borehole of minimum length between a start point and a target situated in the subsurface.

However, there is still a major obstacle to the complete effectiveness of the trajectory calculation, namely the uncertainty regarding the knowledge of the subsurface. Indeed, the subsurface is generally explored with the aid of seismic campaigns whose results are nowadays 3D seismic blocks. Depth migrations, which provide depthwise images of the subsurface, can be carried out using these seismic blocks. Chiefly distinguishable in these images are wave reflectors, called seismic horizons, which often correspond to boundaries of geological structures, which structures are the major objectives of oil exploration.

Whereas the shape of the geological structure may be relatively clearly apparent, its position in the subsurface is not accurately guaranteed since the depth migrations rely on approximate models of wave propagation velocities in the subsurface. It is therefore appreciated that the result of an uncertainty with regard to the velocity models causes, on concluding the calculations required for the migration, an uncertainty as to the position of the structures in the subsurface. In particular, this uncertainty becomes crucial when, for example, the structure is crossed by a fault dividing it into a compartment regarded as a hydrocarbon trap and a compartment containing no hydrocarbons, and when one wishes specifically to reach the hydrocarbon trap compartment and definitely not the other. Under these conditions, an error of a few meters in the position of the structure then becomes a source of major difficulties which translate into so many additional expenses to remedy same.

The consequences of imprecise knowledge regarding the position of structures were pointed out long ago and various studies have attempted to take them into account. In particular, in an article published in the JPT journal of February 1994, pages 143–149, published by the Society of Petroleum Engineers and entitled "A multidisciplined approach to designing targets for horizontal wells", the authors S. T. Solomon et al focused on defining a target structure in three dimensions together with a certain tolerance. Their approach is based on a multidisciplinary consensus. The various petroleum professionals having defined their own view of the target are led to quantify reasonable uncertainties with regard to their specific parameters. For example, geologists and geophysicists advise of the uncertainty due to depth migration and reservoir specialists the uncertainties regarding the planes of contact of the fluids contained in the trap. These various uncertainties are subsequently weighted one against another. The final result is then a global volume, referred to as a target diagram, defined by the sum of the various volumes associated with each of the uncertain parameters. Specifically, with any contact point X known with uncertainty dX, there is associated the volume V(X) lying between X−dX and X+dX. The objective of the drilling, horizontal in this instance, is then as far as possible to reach the centre of the global volume.

As interesting as it may be, this approach does not offer the driller a trajectory. The driller will be allocated a target volume to be reached and it falls to him to choose the best trajectory to get there.

The subject of the present invention is a method of determining an optimal trajectory for reaching a target situated in a medium, for example the subsurface, and whose position is known in an uncertain manner, the said method making it possible to remedy the drawbacks and inadequacies of the prior techniques.

The method according to the invention for determining at least one optimal trajectory starting from a predetermined point of a medium so as to reach a target situated in this medium and comprising a centre and a peripheral boundary, the said target forming a centred volume, the position of each of whose points is known with geometrical uncertainties, is characterized in that it consists in:

defining for the centred volume a gain which takes a first value at the centre of the said centred volume, a second value lower than the said first value at each of the points of the peripheral boundary, intermediate values at each of the other points of the said centred volume and a zero value outside the centred volume, determining a statistically significant number of instances of the positions of the centred volume as a function of the geometrical uncertainties which affect it, summing at each point of the medium the values taken by the gain for the various positions of the centred volume so as to obtain an aggregate gain at each point, defining a volume of interest, site of the points with positive aggregate gains in the medium, defining curvilinear trajectories which pass through the volume of interest from at least one entry point of the volume of interest to at least one exit point of the said volume of interest, integrating the aggregate gain along each of the said curvilinear trajectories in such a way as to obtain a profit associated with each trajectory, and retaining all the trajectories whose profit is greater than a threshold.

According to another characteristic of the invention, the statistically significant number of instances is obtained by random drawing.

According to another characteristic of the invention, geometrical uncertainty vectors are allocated to each point of the medium and the resultant uncertainty vector is calculated, which is assigned to the said point of the medium.

According to another characteristic of the invention, the medium is a portion of subsurface enclosing seismic horizons defined by a depth migration of seismic data relating to the said portion, and three geometrical uncertainty vectors are allocated to each point of the medium, these being an uncertainty vector regarding the picking of the horizons, an uncertainty vector regarding the depth migration and an uncertainty vector regarding seismic tie of the horizons with respect to at least one borehole of the medium so as to calculate the resultant vector.

According to another characteristic of the invention, at each point of the medium, the geometrical uncertainty vectors vary in magnitude without varying in direction.

According to another characteristic of the invention, the directions of the uncertainty vectors are predetermined.

According to another characteristic of the invention, at neighbouring points of the centred volume, the magnitudes of the resultant uncertainty vectors exhibit values such that the said neighbouring points are not displaced independently during the displacement of the centred volume.

According to another characteristic of the invention, when fractures pass through the centred volume, the gain associated with all the points of the centred volume which are separated from the centre of the target by at least one fracture is zeroed.

According to another characteristic of the invention, when the centred volume contains seismic horizons through which there passes at least one fault, the points of contact of the horizons with the fault are securely attached during the displacement of the centred volume.

According to another characteristic of the invention, among the trajectories whose profit is above a threshold, those trajectories are selected which optimize a predetermined criterion such as that which minimizes the cost of drilling or the length of the trajectory.

According to another characteristic of the invention, the medium enclosing the target is bounded by an upper surface and the trajectory possesses a start point situated in the medium, between the target and the said surface or on this surface.

Advantageously, for the implementation of the method according to the invention, the medium enclosing the centred volume is represented in the form of a three-dimensional meshed network with axes x, y and z which comprises nodes whose position is known with a geometrical uncertainty I, which is defined by a vector having components Ix, Iy and Iz along the three axes of the medium and represented by three statistical density functions. In particular, when the said medium is a portion of subsurface which encloses seismic horizons and faults, defined by a depth migration of seismic data relating to the said portion, a meshing of the medium is carried out which includes a meshing of the horizons and the faults detected after the depth migration of the seismic block. Indeed, the layer boundaries (horizons) and fault boundaries are favoured supports of the mesh. More precisely, the meshing of the subsurface is carried out with the aid of structural maps deduced from seismic surveying, which maps are in general tied to exploration wells.

For an implementation of the method according to the invention by using the said meshed network:

the target is defined as a target node C of the medium surrounded by a neighbourhood V, which is a meshed volume contained in the medium and affected at each of its nodes by the geometrical uncertainties of the medium, which are represented by uncertainty vectors whose resultant is formed at each node, a fixed node D contained in the medium and situated outside the neighbourhood V is chosen as start point of the trajectory, a maximum gain is assigned to the target node C and a decreasing gain is assigned to the nodes included in the neighbourhood V as a function of distance away from the target node C, down to a minimum gain at the periphery of the neighbourhood V, and a zero gain is assigned to all the nodes of the medium outside the neighbourhood V, random drawing is carried out for the magnitudes of the uncertainty vectors at each node of the target and each node is displaced along the resultant uncertainty vector allocated to it, each set of new locations of the nodes constituting an instance of position of the target, the gains deduced from each instance of position of the target (C, V) are summed at each node of the medium and the aggregate gain is allocated to the node concerned, a volume of interest is defined, site of the nodes of the medium whose aggregate gain is positive, the volume of interest is inscribed within a parallelepiped oriented along the three axes of the medium, an entry face and an exit face are chosen on the parallelepiped, the entry and exit faces of the parallelepiped are meshed, a profit is calculated for all the rectilinear segments of each trajectory connecting each of the nodes of the mesh of the entry face to all the nodes of the mesh of the exit face, the said profit being the sum of the aggregate gains allocated to the nodes of those mesh cells of the volume of interest through which the segment passes, the set of segments of the trajectories exhibiting a profit above a first threshold is preserved, the segments of the preserved trajectories are joined to the start node D so as to obtain final trajectories and a cost is calculated for each of the said trajectories, and the final trajectories having a cost below a second threshold are selected as optimal final trajectories connecting the start node D to the target node C.

In the implementation of the method explained hereinabove, the medium is a meshed portion of subsurface containing faults and a zero gain is assigned to all the nodes of the neighbourhood V which are separated from the target node C by at least one fault.

The invention will be better understood on reading the following description of an embodiment illustrated by the appended drawings in which.

Figure 1:
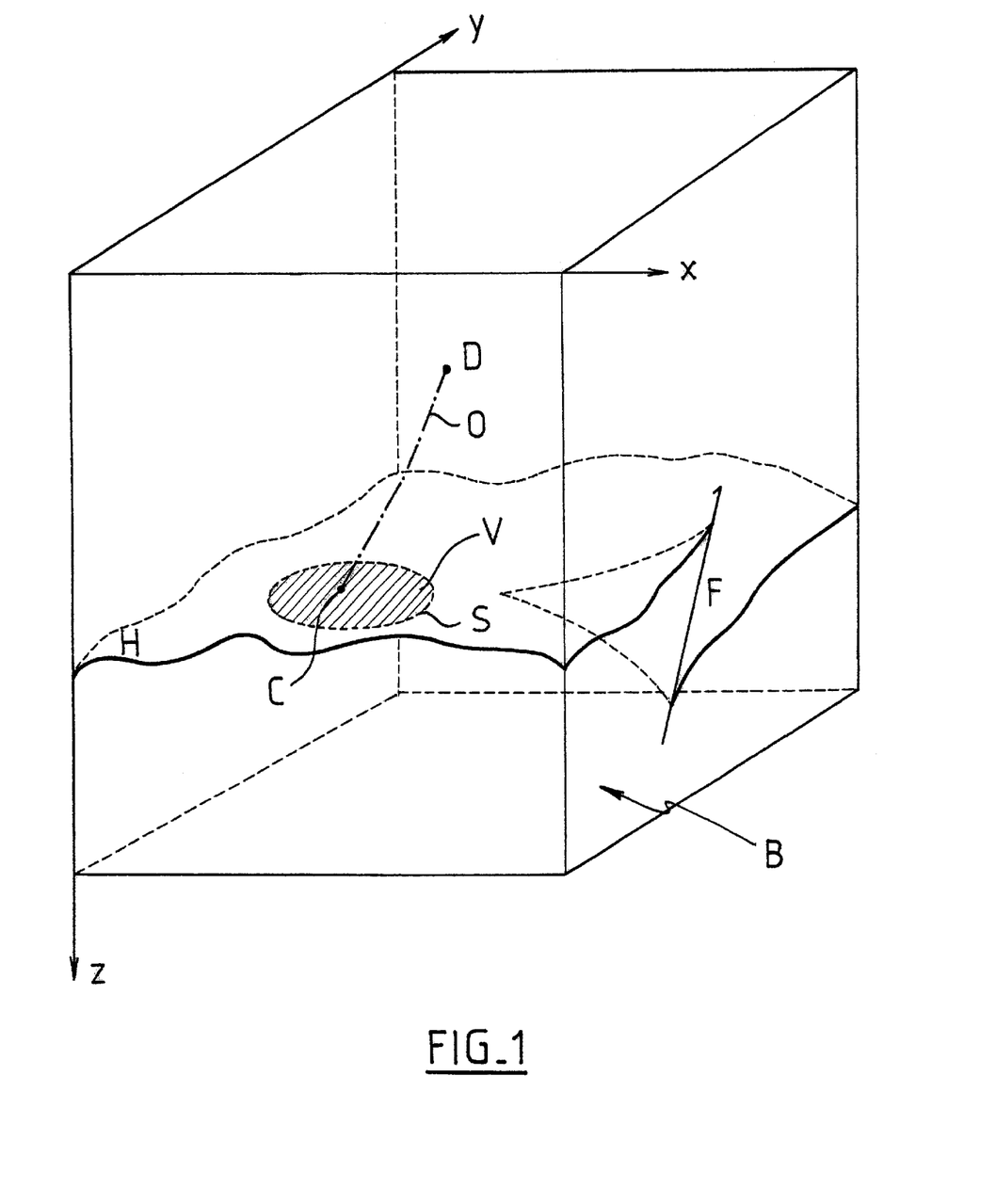
FIG. 1 is a schematic representation of a 3D seismic block containing a surface featuring the roof of an oil reservoir and on which a target has been chosen.

Represented in FIG. 1 is a three-dimensional seismic block B with axes x, y and z, which represents a portion of a medium, the said block having been obtained by conventional processing of reflection seismic survey data acquired over the said portion, supplemented with an analysis performed by interpreters.

Inside the seismic block, more or less continuous seismic horizons are conventionally distinguished. The horizons are likened to boundaries of sediment layers and the discontinuities to fractures or faults. Inside the block B has been represented a single seismic horizon, namely the surface H representing for example the roof of an oil reservoir. This horizon is generally affected by faults, a single one F being represented in FIG. 1. Although not indicated in FIG. 1, so as not to overload the diagram, the seismic block B, the surfaces and the interior faults are meshed in full as indicated in FIG. 2.

On the surface H is chosen a node C which is the target to be reached. The target node C is surrounded by a neighbourhood V which is projected onto the surface H. The projection of the neighbourhood is bounded by the dotted curve S. A maximum gain is assigned to the target node C and a decreasing gain included within the neighbourhood V is assigned as a function of distance away from the target node C, down to a minimum gain at the periphery of the neighbourhood V. A zero gain is then assigned to all the nodes of the block B outside the neighbourhood V.

The node D, start point of all the trajectories, is situated beneath the upper surface of the block B. An instance of trajectory O would for example be manifested by a joining of the node D to the node C.

Figure 2:
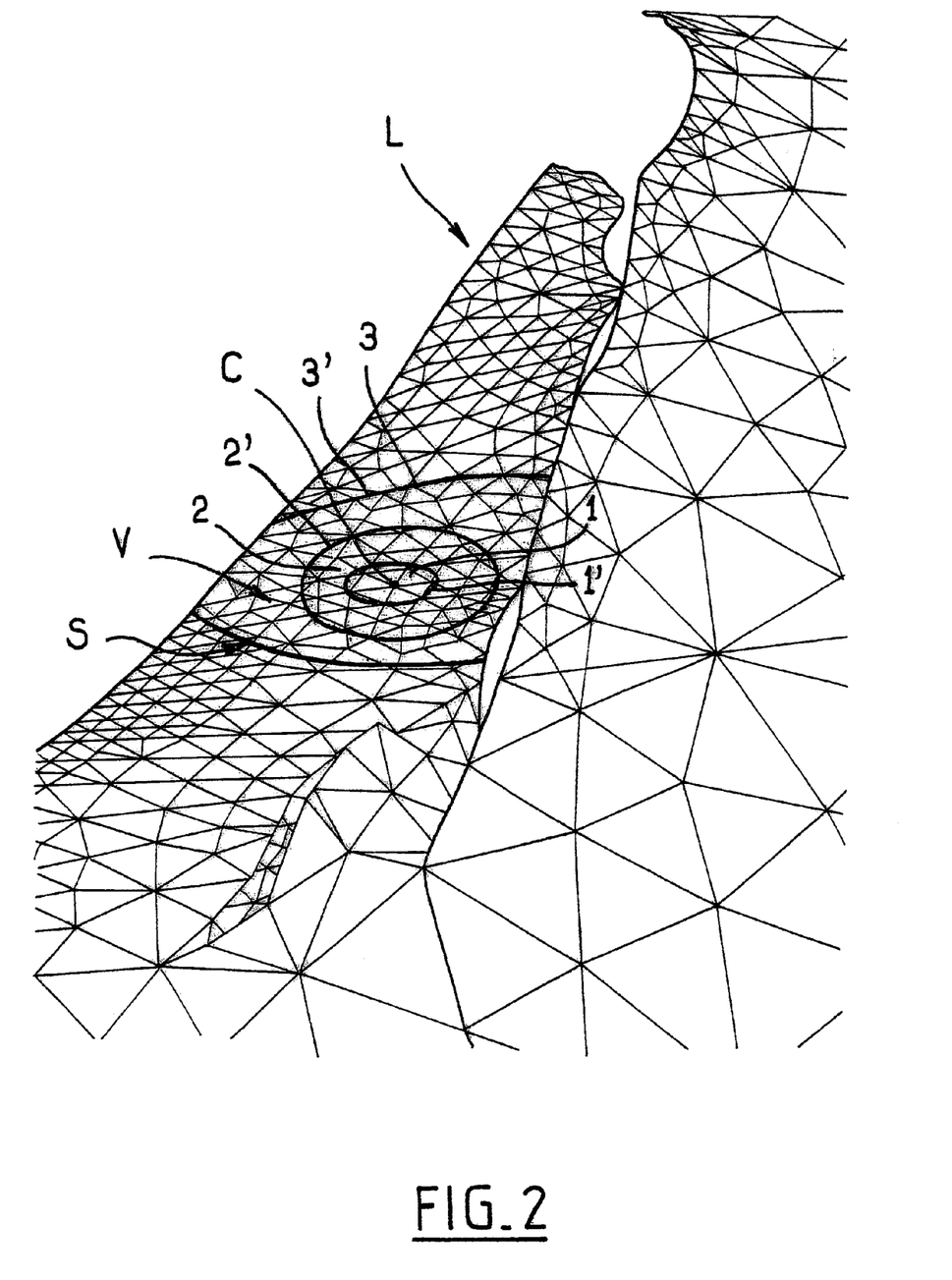
FIG. 2 represents a meshed structural map of the roof of the oil reservoir shown schematically in FIG. 1 and on which are indicated the target and its neighbourhood.

FIG. 2 represents a partial and meshed structural map of the roof of a reservoir. The mesh appears as a triangulation of the roof of the reservoir, and the greater the oil interest, the finer the mesh. At the centre of the figure is a kind of tongue L, which is an interesting part of the roof of the reservoir, attached only to the remainder of the roof of the reservoir at its lower part. The upper and lateral boundaries of this tongue L are due to the presence of several faults which will intersect the roof of the reservoir.

In this example, the oil reservoir is the objective which it is desired to reach in the subsurface. More precisely, the target C is a point on the surface of the reservoir, a point which is more likely to be situated in the top part of the reservoir since it is this part which has the most chance of containing hydrocarbons. This point is the objective of the optimal trajectory. In FIG. 2, the node C is substantially at the centre of a zone 1 delimited fictitiously by a first boundary 1', the said zone 1 being situated at the centre of the tongue L. Around the zone 1 is a zone 2, bounded fictitiously by a second boundary 2'. In the zone 2 the gain is lower than that of the zone 1, the said gain decreasing from the boundary 2' to a third boundary 3' of the zone 3. The zonation thus created is a representation of the gain allocated to the target, from a maximum at the node C to a minimum on the boundary 3'. Beyond the boundary 3', the gain is zero.

Figure 3:
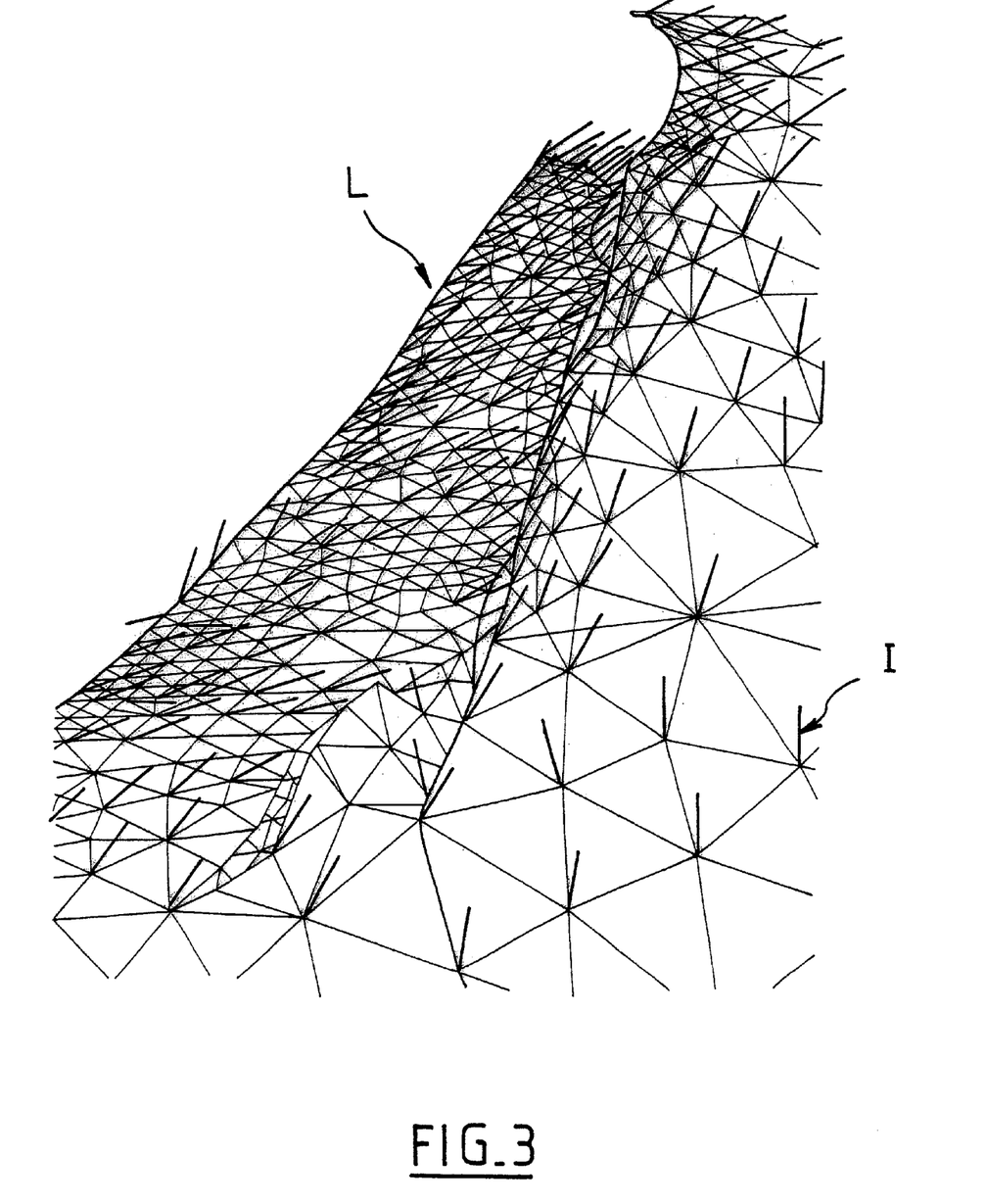
FIG. 3 shows the meshed oil reservoir roof of FIG. 2 and furnished with a set of uncertainty vectors at each node of the mesh.

However, the subsurface representation emanating from the seismic measurements remains uncertain and this uncertainty is generally quantified by a field of uncertainty vectors at every point of the seismic block. Owing to these uncertainties, the surface representing the roof of a structure cannot be located accurately in the subsurface. FIG. 3 shows how, at each node of the mesh, the surface is furnished with a geometrical uncertainty vector I. In the central part may be recognized the tongue L identified hereinabove furnished with a high density of uncertainty vectors. This density exactly reflects the density of the mesh which describes it. The uncertainty vectors vary in magnitude and in direction.

The global geometrical uncertainty I affecting the nodes of the medium is the resultant of the sum of three elementary uncertainties, namely an uncertainty Ip regarding the picking of the horizons, an uncertainty Im regarding depth migration, and an uncertainty If regarding seismic tie with respect to a drilling of the subsurface. The elementary uncertainties are given in the form of three vectors, each vector being accompanied by its own absolute uncertainty.

For example, the elementary uncertainty vector Ip regarding picking possesses an absolute uncertainty dIp. It is then considered, in the method according to the invention, that a probability density function is associated with the vector Ip, which function is advantageously a gaussian density function with zero mean and standard deviation dIp.

At each node, a modulus is determined for each elementary uncertainty vector by applying a Monte-Carlo type method which associates an elementary uncertainty vector with a number drawn at random lying between 0 and 1.

At each node of the medium, the components of each member vector of the trio (Ip, Im, If) are thus determined by random drawing, then the resultant I of these vectors is formed. Each node in the block B is subsequently displaced in the direction of the vector I and by a quantity corresponding to its modulus.

To obtain a statistically significant number of instances of the position of the surface, a minimum of from thirty to fifty random draws must be made, and more advantageously several hundred. The magnitude of the uncertainty vector I is determined at each node of the zone constituting the tongue L. Each node in the block B is subsequently displaced in the direction of the vector I and by the quantity resulting from the random drawings of the components Ip, Im and If. So as not to generate unnatural surfaces (excessively creased), a certain rigidity is allocated to the medium. This rigidity is manifested during random drawing. In the course of the random drawing of the uncertainty vectors with the Monte-Carlo method, randomly drawn values are taken which are substantially similar for neighbouring points.

The position of the surface is thus affected by the uncertainties. The surface then possesses a probability of presence at a site and the probability that the target is situated at a given site is described by a probability density function, the sum of the probability densities describing the uncertainties.

A gain is associated with the target and with its neighbourhood. Each instance of position of the target and of its neighbourhood in the medium entails aggregation of the gains at the sites of the target and its neighbourhood in the medium. Each node of the medium thus concentrates an aggregate gain, which remains zero at places which the instances of position of the target and of its neighbourhood never reach.

Although the target and its neighbourhood seem to change position within the subsurface at each random draw with regard to the geometrical uncertainties, it is clear that this displacement is virtual since the target and its neighbourhood in fact possess a perfectly determined location within the subsurface. Moreover, although possessing uncertainty vectors at every point, the subsurface other than the target and its neighbourhood is not affected by the random draws and, virtually speaking, is not therefore displaced. Nevertheless, if one displaces the target in the volume of interest at each random draw, certain parts of the subsurface surrounding the volume of interest may then be affected by displacements.

At this juncture of the implementation of the method, that is to say at the end of the random draws, each node constituting the mesh of the medium has been furnished with an aggregate gain and the site of the nodes of non-zero aggregate gain defines a volume of interest of any geometrical shape, fixed within the medium.

Figure 4:
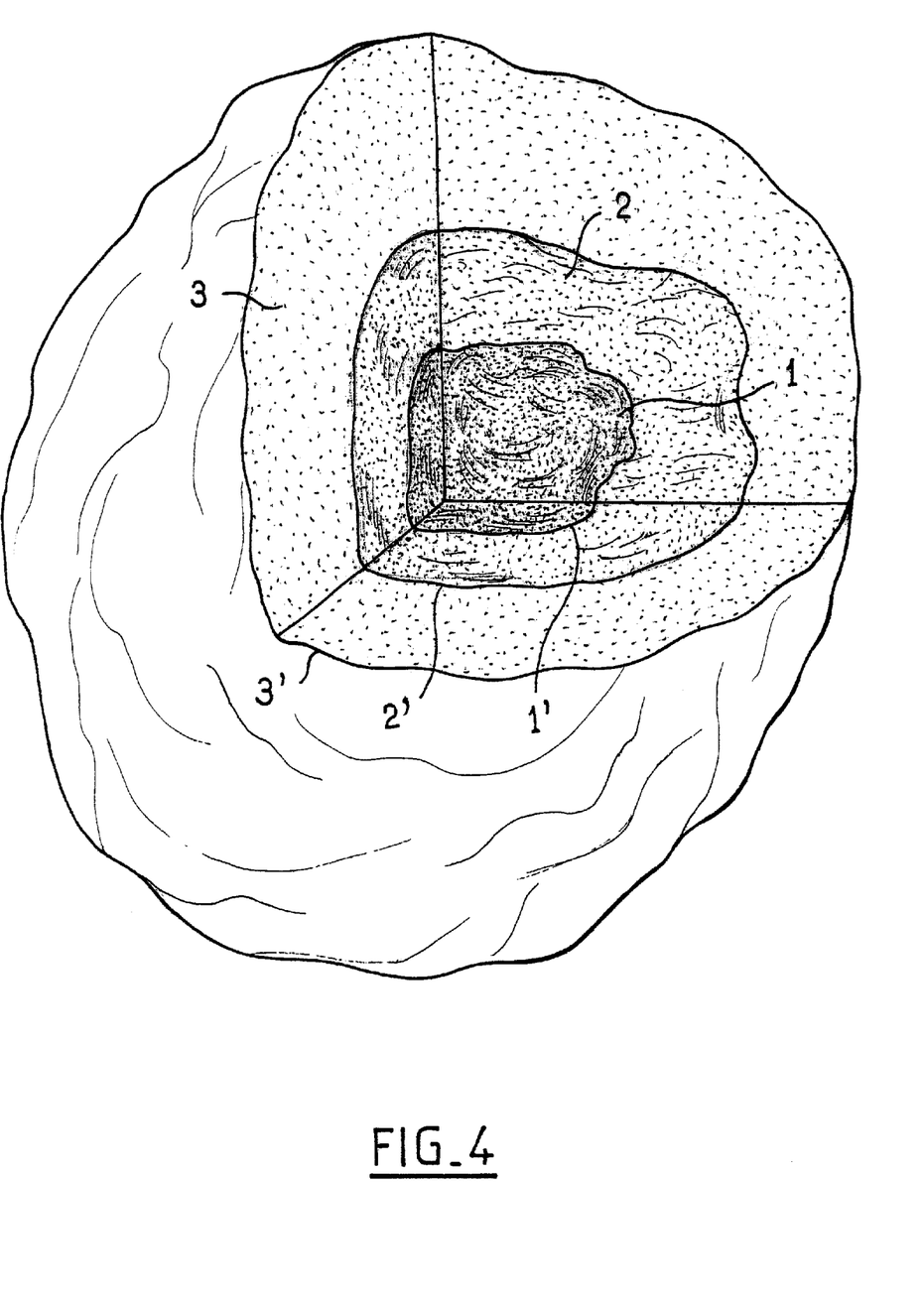
FIG. 4 is an exploded view in three dimensions of a volume of interest showing isovalue probability surfaces.

FIG. 4 is an exploded view in three dimensions of the volume of interest wherein may be seen isovalue probability surfaces girded like so many envelopes around a central point.

Figure 5:
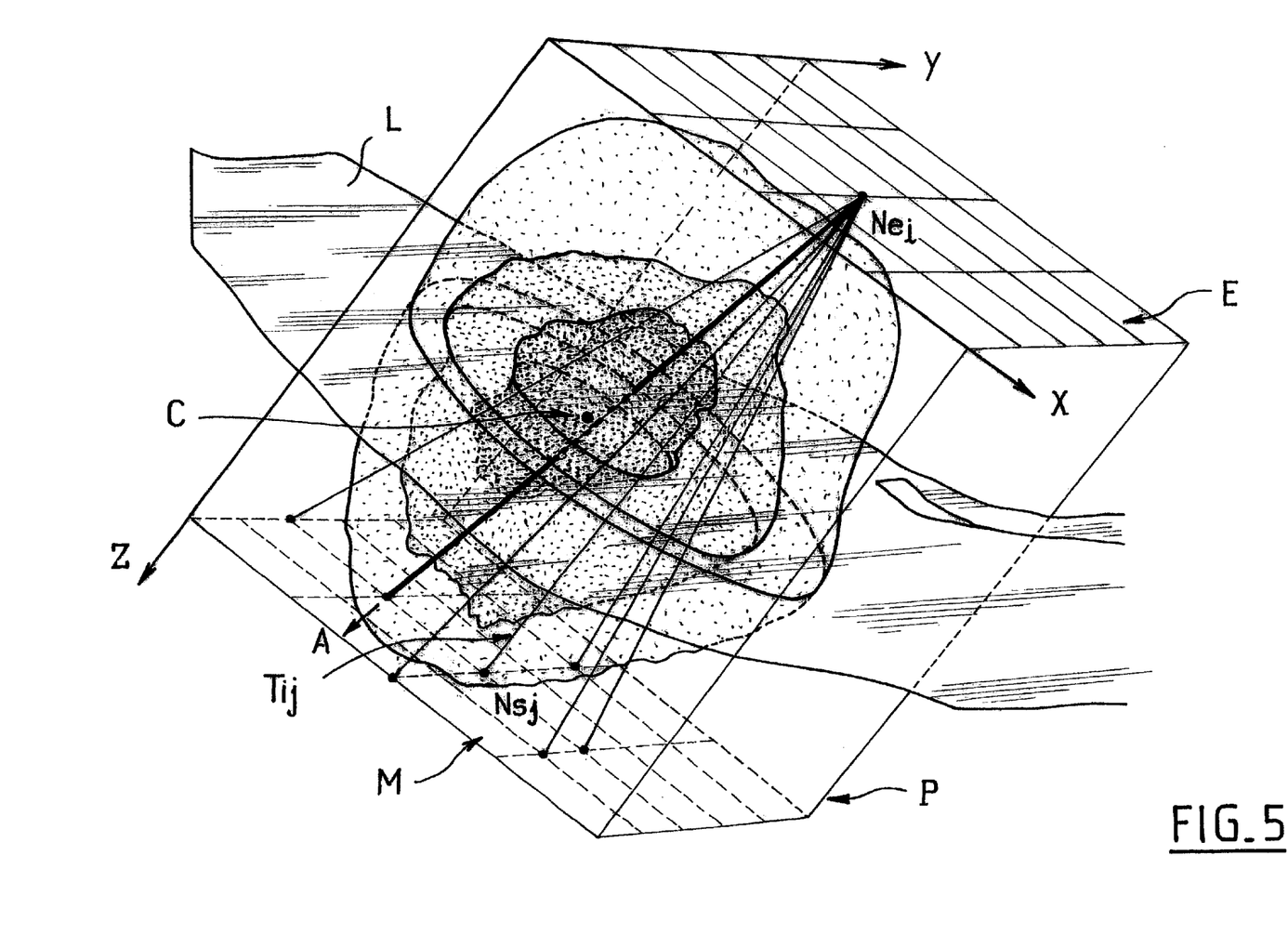
FIG. 5 shows the volume of interest of FIG. 4 inscribed within a parallelepiped in respect of which entry and exit faces have been chosen and meshed.

FIG. 5 shows this same volume intersected by the tongue L, on which the target C is situated. The volume of interest is inscribed there within a parallelepiped P whose three axes are parallel to the three axes of the medium and on which have been chosen an entry surface, the upper face E, and an exit surface, the lower face M. These two surfaces are meshed and the figure shows a set of trajectory segments Tij going from a node Nei of the entry surface to a set of nodes Nsj of the exit surface. In order to generate all the trajectory segments, each of the nodes of the entry surface E is connected to all the nodes of the exit surface M. For each trajectory segment Tij thus generated, the aggregate gains associated with the mesh cells of the medium which it passes through are summed to obtain a profit. The trajectory segments exhibiting a profit above a certain threshold are retained.

Owing to the variation in the uncertainty vectors, the volume of interest always exhibits a direction of elongation A. According to the invention, the method explained hereinabove makes it possible to obtain drilling trajectories which best follow the direction of elongation A. These are precisely the ones which maximize the probability of reaching the chosen target.

Figure 6:
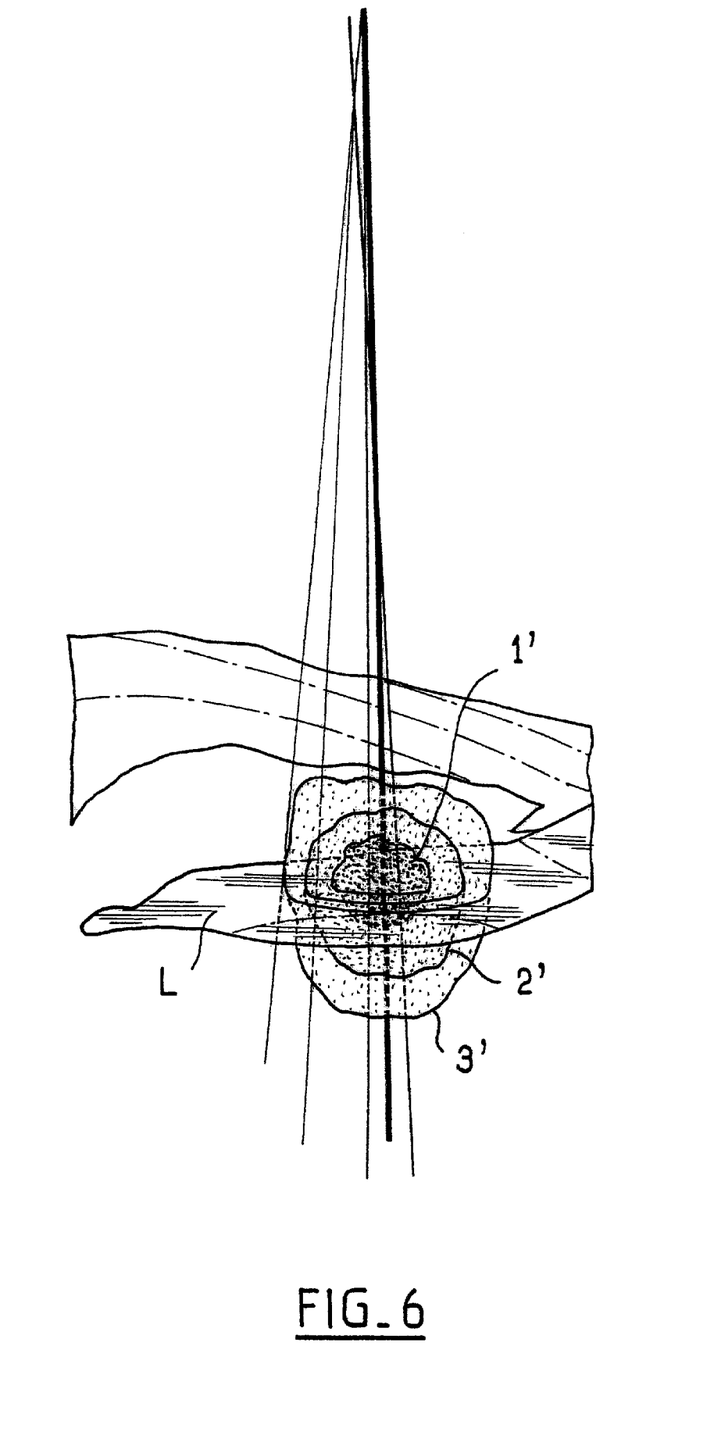
FIG. 6 shows five instances of well trajectories passing through the volume of interest.
Figure 7:
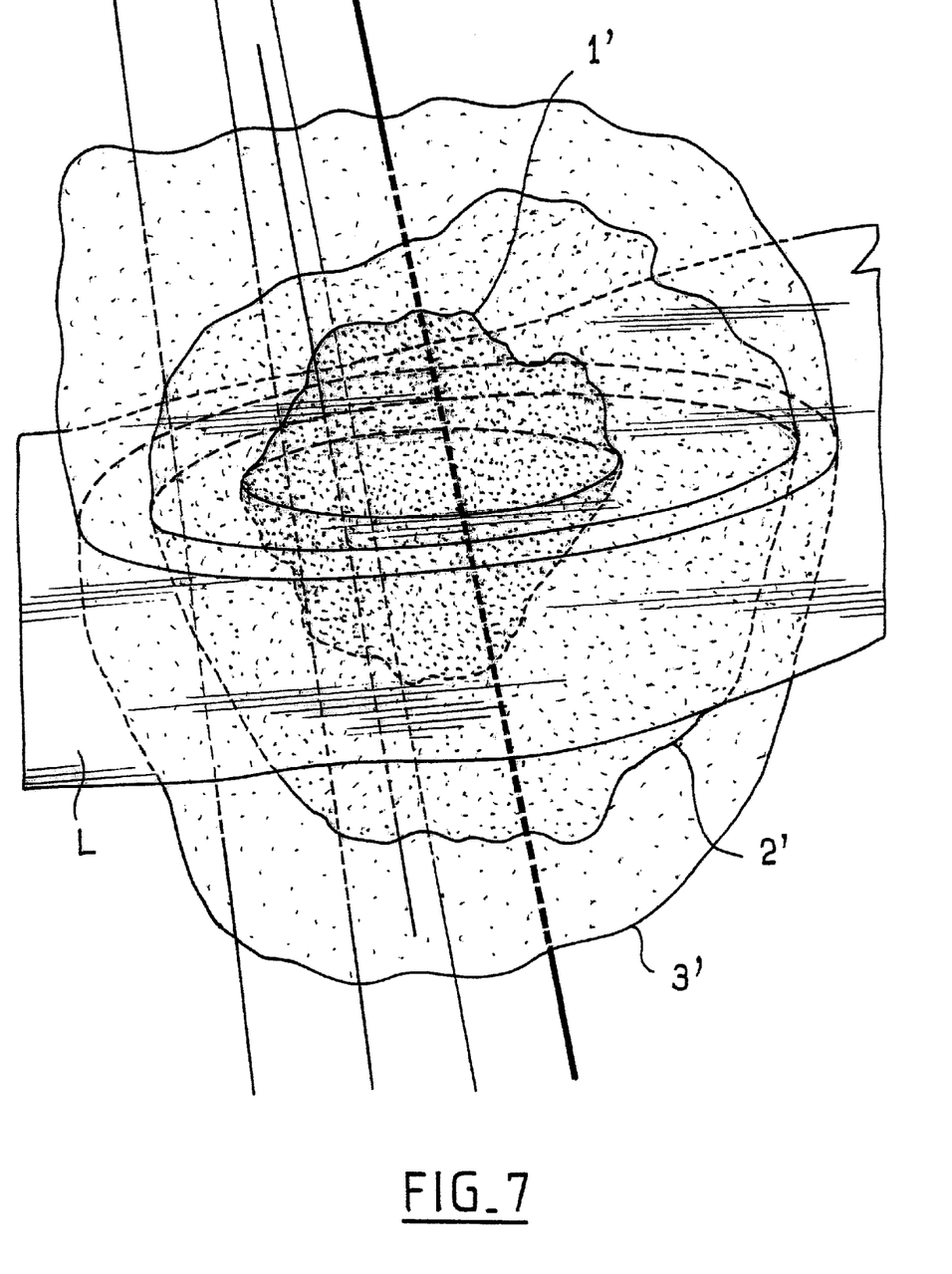
FIG. 7 shows the compared effectiveness of the five instances of trajectories of wells passing through the volume of interest, as represented in FIG. 6 in the direction of the greatest length.

FIG. 6 shows five drilling trajectory segments. The one offering the best profit is plotted emboldened; this is the one which best passes through the volume of interest, that is to say along its direction of elongation A. FIG. 7 is a zoom onto the volume of interest and allows best account to be taken of the effectivenesses of the various trajectory segments.

The trajectory segments retained are then connected to the node D, start point of the set of trajectories, and a cost is calculated for each trajectory.

Figure 8:
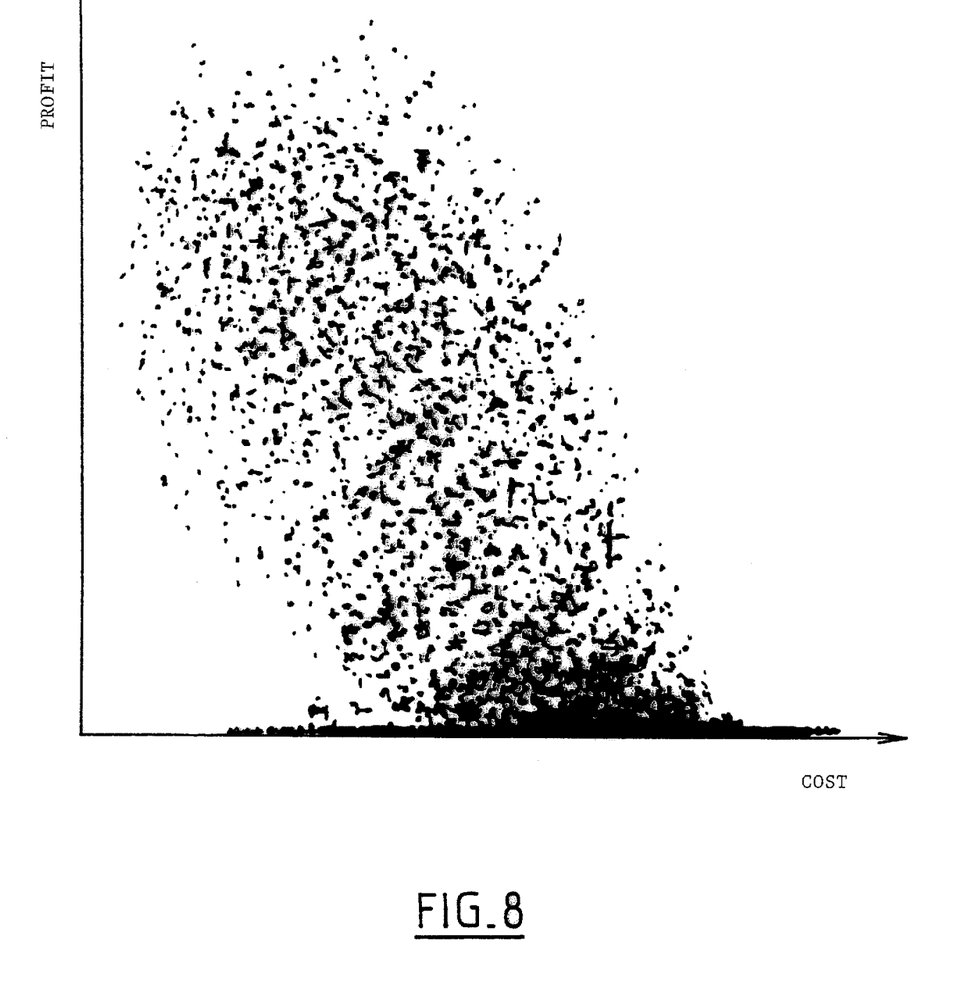
FIG. 8 depicts, in a cost/profit diagram, a scatter of points each representing a well trajectory.

FIG. 8 depicts a scatter diagram, each point of the scatter being the representation of a trajectory. The coordinate axes of the diagram are cost and profit. Each trajectory therein is therefore represented as a point having a certain cost and a certain profit. The most favourable trajectories are those whose profit is a maximum for minimum cost, that is to say those situated in the left bulge of the diagram, at the top.

The final trajectories are composed of at least two parts: an optimized part which best intersects the volume of interest, and an upper part going from the node D, start point of the trajectory, until it enters the parallelepiped circumscribed around the volume of interest. For this latter part of the trajectory, the aggregate gain is zero. In fact, this latter part is not critical as regards penetration of the objective and its optimization obeys the classical optimizations, which in general minimize only the length of the trajectory. However, it is noted that the two parts of the final trajectory must exhibit continuity of curvature where they link up.

The final trajectories having a cost below a second threshold are selected, from among the most favourable trajectories retained in FIG. 8, as optimal final trajectories connecting the start node D to the target node C.

Figure 9:
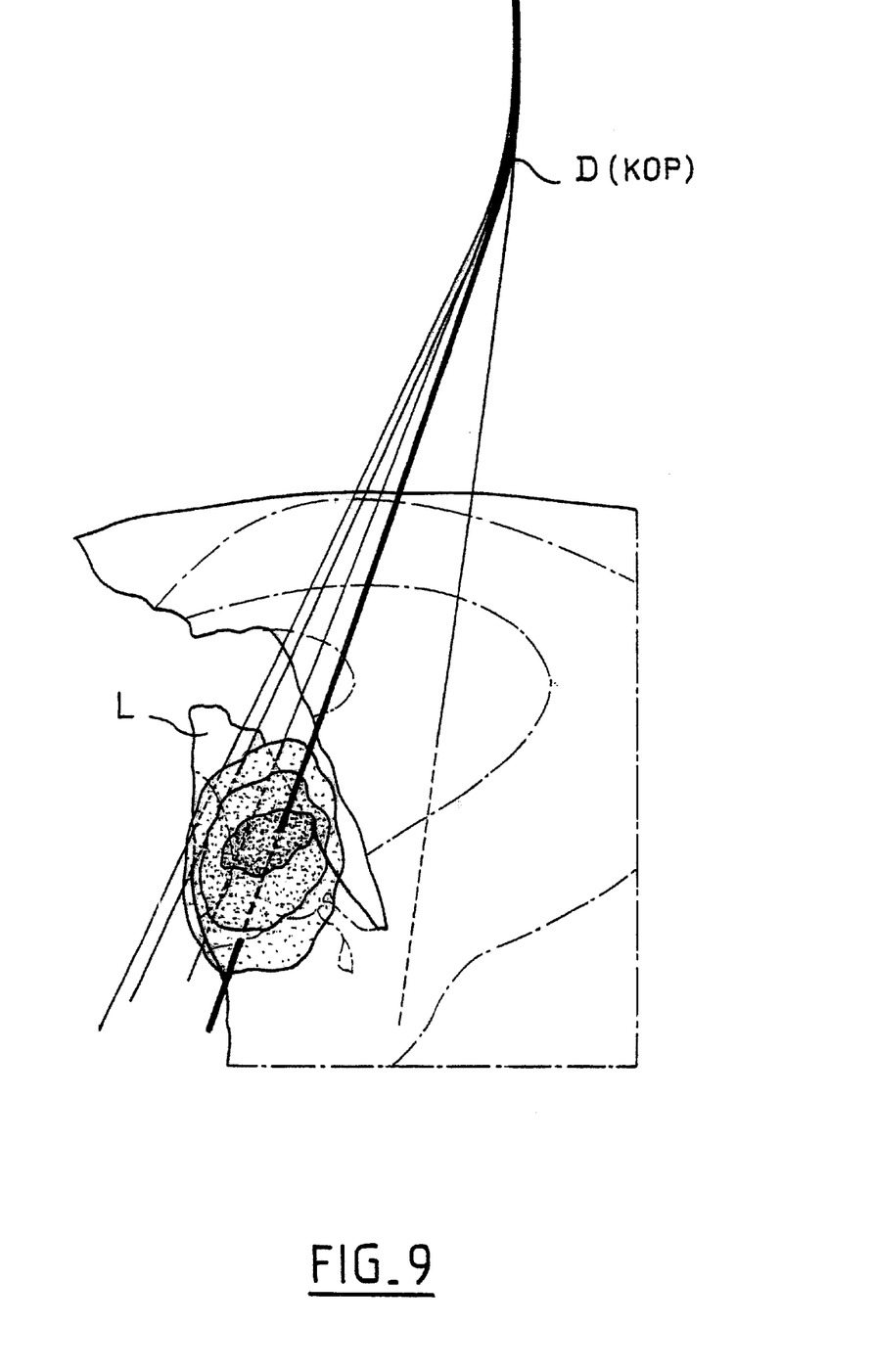
FIG. 9 shows the joining, at the start point of the deviated trajectories, of the elements making up complete well trajectories.

The start point (node D) of the trajectory is arbitrary. In the case where the medium is the terrestrial subsurface, the start point of the trajectory is either on the surface of the medium or at a point of the subsurface between the target and the surface. In particular, when it is not at the surface, the start point of the trajectory is the start point of all the deviated boreholes (or "Kick-Off Point" or "KOP") emanating from the same drilling rig. FIG. 9 shows the position of the KOP in the previous example. This figure reproduces the five complete trajectories of which only a part is plotted in FIGS. 6 and 7.

What is claimed is:

1. A method for determining at least one optimal trajectory starting from a predetermined point so as to reach a target situated in a medium and comprising a centre and a peripheral boundary, said target forming a centred volume, the position of each of whose points is known with geometrical uncertainties, said method consisting of:

(a) defining for the centred volume a gain which takes a first value at the centre of the said centred volume, a second value lower than said first value at each of the points of the peripheral boundary, intermediate values at each of the other points of the said centred volume and a zero value outside the centred volume;

(b) calculating at least 30 instances of the positions of the centred volume as a function of the geometrical uncertainties which affect it;

(c) summing at each point of the medium the values taken by the gain for the various positions of the centred volume so as to obtain an aggregate gain at each point;

(d) defining a volume of interest, site of the points with positive aggregate gains in the medium;

(e) defining curvilinear trajectories which pass through the volume of interest from at least one entry point of the volume of interest to at least one exit point of the said volume of interest;

(f) integrating the aggregate gain along each of the said curvilinear trajectories in such a way as to obtain a profit associated with each trajectory; and (g) retaining all the trajectories whose profit is greater than a threshold, said retained trajectories being the optima trajectories.

2. The method of claim 1, wherein said at least 30 instances are obtained by random drawing.

3. The method of claim 1, wherein geometrical uncertainty vectors are allocated to each point of the medium and the resultant uncertainty vector is calculated, which is assigned to the said point of the medium.

4. The method according of claim 3, wherein the medium is a portion of subsurface enclosing seismic horizons defined by a depth migration of seismic data relating to said portion, and characterized in that three geometrical uncertainty vectors are allocated to each point of the medium, these being an uncertainty vector regarding the picking of the horizons, an uncertainty vector regarding the depth migration and an uncertainty vector regarding seismic tie of the horizons with respect to at least one borehole of the medium so as to calculate the resultant vector.

5. The method of claim 4, wherein at each point of the medium, the geometrical uncertainty vectors vary in magnitude without varying in direction.

6. The method of claim 5, wherein the directions of the uncertainty vectors are predetermined.

7. The method of claim 5, wherein at neighboring points of the centred volume, the magnitudes of the resultant uncertainty vectors exhibit values such that said neighboring points are not displaced independently during the displacement of the centred volume.

8. The method according of claim 3, wherein at each point of the medium, the geometrical uncertainty vectors vary in magnitude without varying in direction.

9. The method of claim 8, wherein the directions of the uncertainty vectors are predetermined.

10. The method of claim 8, wherein at neighbouring points of the centred volume, the magnitudes of the resultant uncertainty vectors exhibit values such that said neighbouring points are not displaced independently during the displacement of the centred volume.

11. The method of claim 1, wherein when fractures pass through the centred volume, the gain associated with all the points of the centred volume which are separated from the centre of the target by at least one fracture is zeroed.

12. The method of claim 1, wherein when the centred volume contains seismic horizons through which there passes at least one fault, the points of contact of the horizons with the fault are securely attached during the displacement of the centred volume.

13. The method of claim 1, wherein among the trajectories whose profit is above a threshold, those trajectories are selected which optimize a predetermined criterion such as that which minimizes the cost of drilling or the length of the trajectory.

14. The method of claim 1, wherein the medium enclosing the target is bounded by an upper surface and the trajectory possesses a start point situated in the medium, between the target and said surface or on this surface.

15. The method of claim 1, wherein the medium is a portion of subsurface which enclosed seismic horizons and faults defined by a depth migration of seismic data relating to said portion, and in that a meshing of the medium is carried out which includes a meshing of the seismic horizons and the faults.

16. The method of claim 15, wherein the medium is meshed in three axes and in that:

(i) the target is defined as a target node C of the medium surrounded by a neighbourhood V, which is a meshed volume contained in the medium and affected at each of its nodes by the geometrical uncertainties of the medium, which are represented by uncertainty vectors whose resultant is formed at each node;

(ii) a fixed node D contained in the medium and situated outside the neighbourhood V is chosen as start point of the trajectory;

(iii) a maximum gain is assigned to the target node C and a decreasing gain is assigned to the nodes included in the neighbourhood V as a function of distances away from the target node C, down to a minimum gain at the periphery of the neighbourhood V, and a zero gain is assigned to all the nodes of the medium outside the neighbourhood V;

(iv) random drawing is carried out for the magnitudes of the uncertainty vectors at each node of the target and each node is displaced along the resultant uncertainty vector allocated to it, each set of new locations of the nodes constituting an instance of position of the target;

(v) the gains deduced from each instance of position of the target (C, V) are summed at each node of the medium and the aggregate gain is allocated to the node concerned;

(vi) a volume of interest is defined, site of the nodes of the medium whose aggregate gain is positive;

(vii) the volume of interest is inscribed within a parallelepiped oriented along the three axes of the medium;

(viii) an entry face and an exit face are chosen on the parallelepiped;

(ix) the entry and exit faces of the parallelepiped are meshed;

(x) a profit is calculated for all of the rectilinear segments of each trajectory connecting each of the nodes of the mesh of the entry face to all the nodes of the mesh of the exit face, the said profit being the sum of the aggregate gains allocated to the nodes of those mesh cells of the volume of interest through which the segment passes;

(xi) the set of segments of the trajectories exhibiting a profit above a first threshold is preserved;

(xii) the segments of the preserved trajectories are joined to the start node D so as to obtain final trajectories and a cost is calculated for each of the said trajectories; and (xiii) the final trajectories having a cost below a second threshold are selected as optimal final trajectories connecting the start node D to the target node C.

17. The method of claim 16, wherein the medium is a meshed portion of subsurface containing faults and a zero gain is assigned to all the nodes of the neighbourhood V which are separated from the target node C by at least one fault.

* * * * *